(12) United States Patent
Lund

(10) Patent No.: US 10,097,775 B2
(45) Date of Patent: Oct. 9, 2018

(54) DIGITAL OUTPUT BINNING

(71) Applicant: Sensors Unlimited, Inc., Princeton, NJ (US)

(72) Inventor: Joshua Lund, Dallas, TX (US)

(73) Assignee: Sensors Unlimited, Inc., Princeton, NJ (US)

( * ) Notice: Subject to any disclaimer, the term of this patent is extended or adjusted under 35 U.S.C. 154(b) by 91 days.

(21) Appl. No.: 15/266,134

(22) Filed: Sep. 15, 2016

(65) Prior Publication Data

US 2018/0077365 A1   Mar. 15, 2018

(51) Int. Cl.
*H04N 5/33* (2006.01)
*H04N 5/347* (2011.01)
*H04N 5/378* (2011.01)

(52) U.S. Cl.
CPC .............. *H04N 5/347* (2013.01); *H04N 5/33* (2013.01); *H04N 5/378* (2013.01)

(58) Field of Classification Search
None
See application file for complete search history.

(56) References Cited

U.S. PATENT DOCUMENTS

| | | | |
|---|---|---|---|
| 7,420,154 B2 | 9/2008 | Shah | |
| 7,884,871 B2 | 2/2011 | Smith et al. | |
| 9,066,032 B2 | 6/2015 | Wang | |
| 9,385,738 B2 | 7/2016 | Kelly et al. | |
| 2011/0007873 A1* | 1/2011 | Rudin | H04N 3/1593 378/62 |
| 2011/0309236 A1* | 12/2011 | Tian | H01L 27/14603 250/208.1 |
| 2013/0154685 A1* | 6/2013 | Noyes | G06F 17/5054 326/38 |
| 2015/0189198 A1 | 7/2015 | Park et al. | |
| 2016/0156826 A1* | 6/2016 | Hagiwara | H04N 5/3535 348/221.1 |

* cited by examiner

*Primary Examiner* — Eileen M Adams
(74) *Attorney, Agent, or Firm* — Locke Lord LLP; Scott D. Wofsy; Joshua L. Jones

(57) ABSTRACT

An imaging system includes a readout integrated circuit (ROIC) is operatively connected to receive photocurrent from a plurality of photodetectors (e.g., from a plurality of photodetectors of a photodetector array (PDA)). An event detection circuit in each ROIC pixel readout circuit generates binary output data, wherein the ROIC compresses the binary output data with a logical summary binning of N×M pixel binary outputs into a single summary output bit. The ROIC can be configured to receive image data from the photodetectors to form an image at a first frame rate, and to receive the binned binary data from the photodetectors at a second frame rate higher than the first frame rate.

14 Claims, 5 Drawing Sheets

Single Pixel Diagram

Row Select Timing Diagram

DIGITAL OUTPUT BINNING

BACKGROUND OF THE INVENTION

1. Field of the Invention

The present disclosure relates to digital imaging devices and techniques, and more particularly to pixel binning for digital imaging devices and techniques.

2. Description of Related Art

A shortwave infrared (SWIR) focal-plane array (FPA) includes an array of IR-sensitive sensing devices (referred to as photodetectors) and a readout integrated circuits (ROIC) chip having an array of ROIC pixel and readout pixel circuits. The IR photodetectors generate an electrical charge, voltage, or resistance in response to detecting photons in the IR wavelengths. The magnitude of the photodetector output is proportional to the number of photons detected by the photodetector.

The output of each photodetector is received and processed in a corresponding readout pixel circuit of the ROIC. Although the photodetector and the corresponding ROIC circuit in the ROIC chip can be disposed on different substrates, the photodetector and the corresponding ROIC readout pixel circuit are referred to as a pixel.

A multimode SWIR camera can be used for imaging and laser pulse detection. In laser pulse detection mode, a laser designator that includes a laser light source designates targets by directing a coded laser signal at the targets. Laser designator signals are generally very short duration laser pulses (e.g. less than 100 ns) repeated at some fixed frequency, the fixed repetition frequency representing the laser's code. A coded laser signal can be reflected off of the targets and used to identify the target. In multimode applications, it is desirable to simultaneously sense an image representing a background scene and detect coded laser pulses at locations within that scene.

However, image signals are composed of relatively low frequencies and are processed at a relatively low frame rate, whereas the laser signal pulse shapes have relatively high-frequencies and accurate decoding of their repetition rates demands high frame rates. In order to process both low and high frequency signals, conventional SWIR cameras have generally performed only one of high frequency signal detection or low frequency imaging at a given time.

More recent multimode SWIR cameras have used different pixel circuits for acquiring and/or processing the image signals and the laser signals. Some multimode SWIR cameras have been configured to include multimode pixels that share one or more components for acquiring and/or processing the image signals and the laser signals at a cost of interdependence that can limit flexibility regarding processing the image and laser signals in different ways.

While conventional methods and systems have generally been considered satisfactory for their intended purpose, there is still a need in the art for improved imaging systems and techniques. The present disclosure provides a solution for this problem.

SUMMARY OF THE INVENTION

An imaging system includes a readout integrated circuit (ROIC) is operatively connected to receive photocurrent from a plurality of photodetectors (e.g., from a plurality of photodetectors of a photodetector array (PDA)). An event detection circuit in each ROIC pixel readout circuit generates binary output data, wherein the ROIC compresses the binary output data with a logical summary binning of N×M pixel binary outputs into a single summary output bit.

Within each ROIC pixel, a pulse detection circuit can assess if a high frequency pulse is present on the input photocurrent and generate an indicative binary output. The binary data can be indicative of presence or lack of presence of an event detected at the PDA.

The ROIC can be configured to receive image data from the photodetectors to form an image at a first frame rate, and to receive high frequency pulse data from the photodetectors and summarize it as binned binary data at a second frame rate higher than the first frame rate.

The event detected at the PDA can include a laser pulse. The second frame rate can be on the order of 1000 frames per second. The first frame rate can be on the order of 10 frames per second.

The ROIC pixel array can be controlled to read out the binned binary data, wherein pixel outputs from the ROIC are binned in sub-arrays of N×M pixels. The ROIC can include logic to perform a logical OR function on each N×M sub-array of pixels to indicate if any pixels in the sub-array represent a logic high. The ROIC can include logic to generate a summary bit representing a logical high for the entire sub-array if any of the pixels in the sub-array represent a logic high, and representing a logic low for the entire sub-array if any of the pixels in the sub-array represent a logic low, and to output the summary bit for each sub-array, realizing a compression rate of N×M to 1. The summary bit may also be generated by a Boolean logic operation other than logical OR.

The ROIC can include logic for binning the binary data, wherein the PDA includes no dedicated circuitry for binning. The ROIC can include logic for combining multiple pixels in a column during readout by selecting multiple rows of pixels, simultaneously connecting them to the column. The ROIC can include a respective pulldown circuit for each pixel, and the ROIC includes a respective common pull-up circuit for each column, in a wired-OR architecture. It is also contemplated that, the ROIC can include a respective pullup circuit for each pixel and a respective common pull-down circuit for each column.

The ROIC can include an array of pixel readout circuits. Each pixel readout circuit can be configured to operatively connect with a respective pixel of a photodetector array (PDA) to receive image data from a photodetector of the respective pixel. The array of readout circuits can be operatively connected to the PDA to receive image data from the photodetectors to form an image at a first frame rate and to receive binned binary data from the photodetectors at a second frame rate higher than the first frame rate, wherein the binary data is indicative of presence or lack of presence of an event detected at the FPA.

The ROIC can be configured to accelerate binary event data readout time by a factor of N, wherein N is the number of rows in the binning sub-array, to accelerate binary event data readout time by a factor of M, wherein M is the number of columns in the binning sub-array, or to accelerate binary event data readout time by a factor of N×M, wherein N×M is the number of pixels in a binning sub-array. The ROIC can include logic to perform a Boolean logic function on each N×M sub-array to generate a single binary summary bit for each sub-array. For example, the Boolean logic function can includes a logical OR. It is also contemplated that any other suitable Boolean logic function can be used, e.g., a logical AND, a logical NOR, or a logical NAND.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
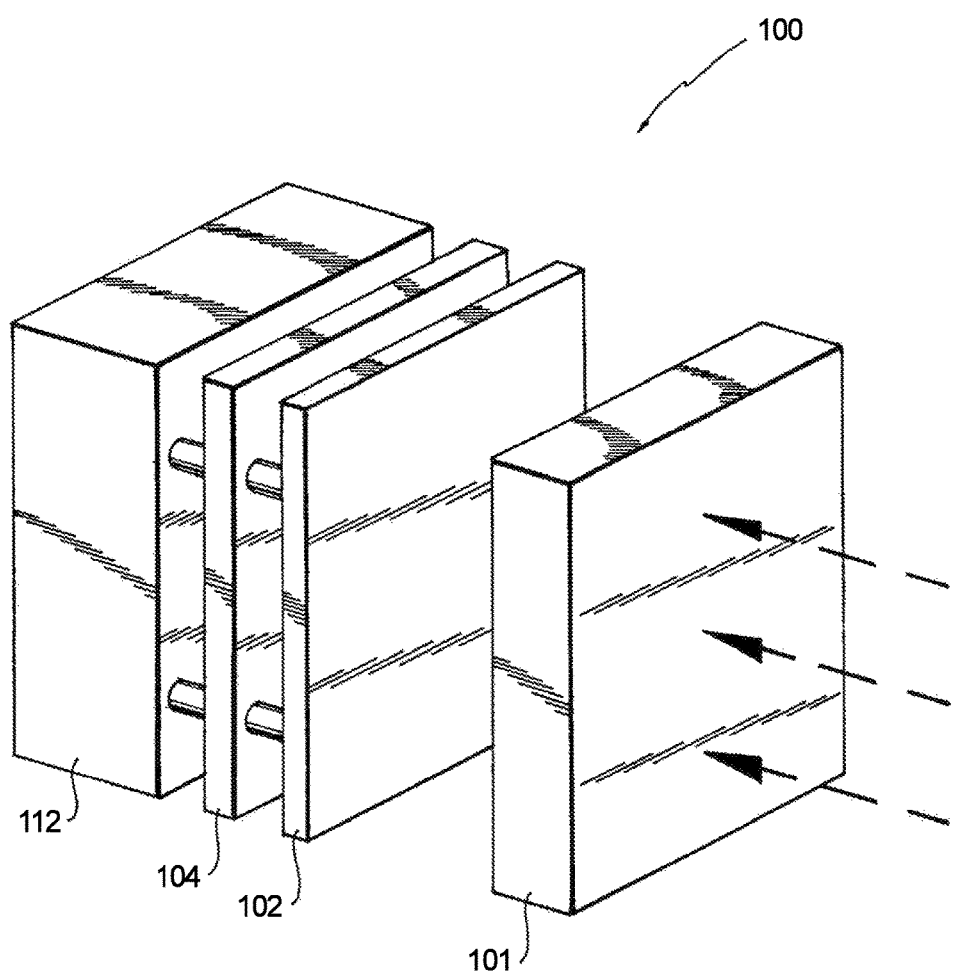
FIG. 1 is a schematic view of an exemplary embodiment of an imaging system constructed in accordance with the present disclosure, showing the focal plane array (FPA) and readout integrated circuit (ROIC)

Reference will now be made to the drawings wherein like reference numerals identify similar structural features or aspects of the subject disclosure. For purposes of explanation and illustration, and not limitation, a partial view of an exemplary embodiment of an imaging system in accordance with the disclosure is shown in FIG. 1 and is designated generally by reference character 100. Other embodiments of imaging systems in accordance with the disclosure, or aspects thereof, are provided in FIGS. 2-3, as will be described. The systems and methods described herein can be used to provide high frame rate laser pulse detection on a common focal plane array where low frame rate imaging is also being provided, for example.

For some applications, for example laser pulse detection, it can be useful to output binary output from each pixel in a focal plane array (FPA), indicating if an event such as a pulse was detected or not. The output of such an FPA is a binary bitmap. It can be useful in some applications to generate such bitmaps at very high frame rates, in such case the maximum frame rate may be limited by the bandwidth of a high-speed digital output channel, or by other digital data routing circuitry. This disclosure provides systems and methods that allow for a trade off in spatial resolution to provide the improved temporal resolution, in a way that allows a single FPA to be used for both high frame rate pulse detection, and for lower frame rate video imaging.

Imaging system 100 includes a photodetector array (PDA) 102, and lens optics 101 for focusing images on FPA 102, as indicated by the three large arrows in FIG. 1. FPA 102 can be of any suitable array type, for example a two-dimensional array with a 640 by 512 grid of pixels, wherein each pixel includes a respective photodetector. However, any other suitable array configuration can be used without departing from the scope of this disclosure.

ROIC 104 is operatively connected to PDA 102 to receive image data from the photodetectors, e.g., to condition electrical signals from the array for imaging. PDA 102 and ROIC 104 combine to form a focal plane array (FPA). A module 112 is operatively connected to ROIC 104. The module 112 provides electronic architecture such that signals from ROIC 104 can be conditioned for signal output, and analyzed with embedded logic such as that within a field programmable gate array (FPGA).

Figure 2:
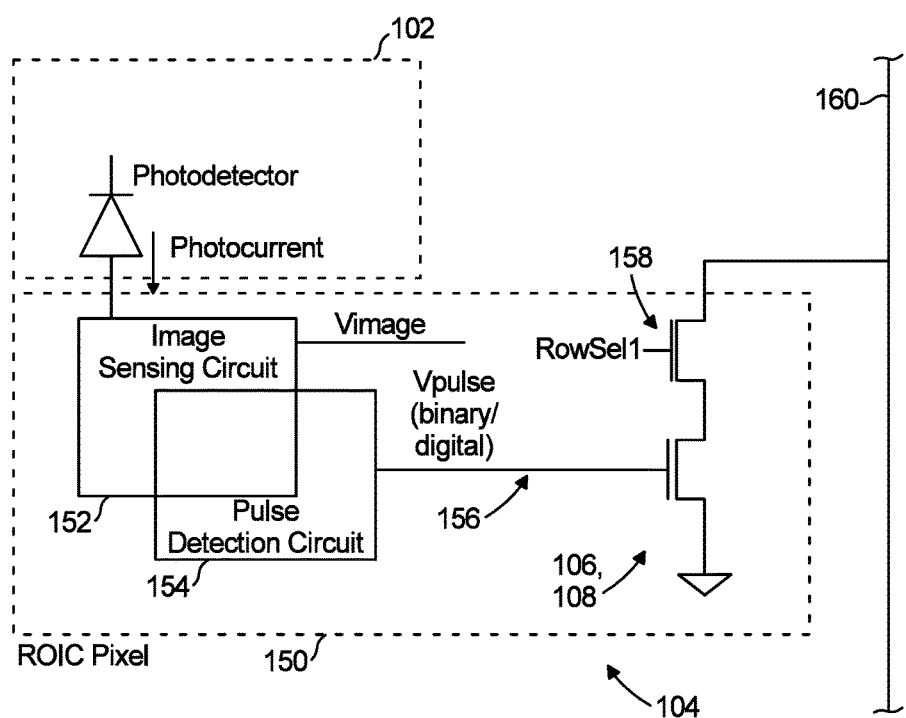
FIG. 2 is a schematic diagram of a ROIC pixel readout circuit of the ROIC of FIG. 1, showing how the ROIC pixel connects to the pulse output column line.

With reference now to FIG. 2, one ROIC pixel 150 of ROIC 104 is shown. ROIC pixel 150 includes an image sensing circuit 152 connected to receive photocurrent from a respective photodetector 154 of PDA 102, and to output image data. A pulse detection circuit 154 is connected to image sensing circuit 152 to determine whether an event such as a laser pulse is present in the photocurrent from photodetector 154. The pixel output 156 of pulse detection circuit 154 and a respective row select 158 are connected to pulse output column line 160 by way of a respective a pixel readout circuit 106 and pulldown circuit 108.

Figure 3:
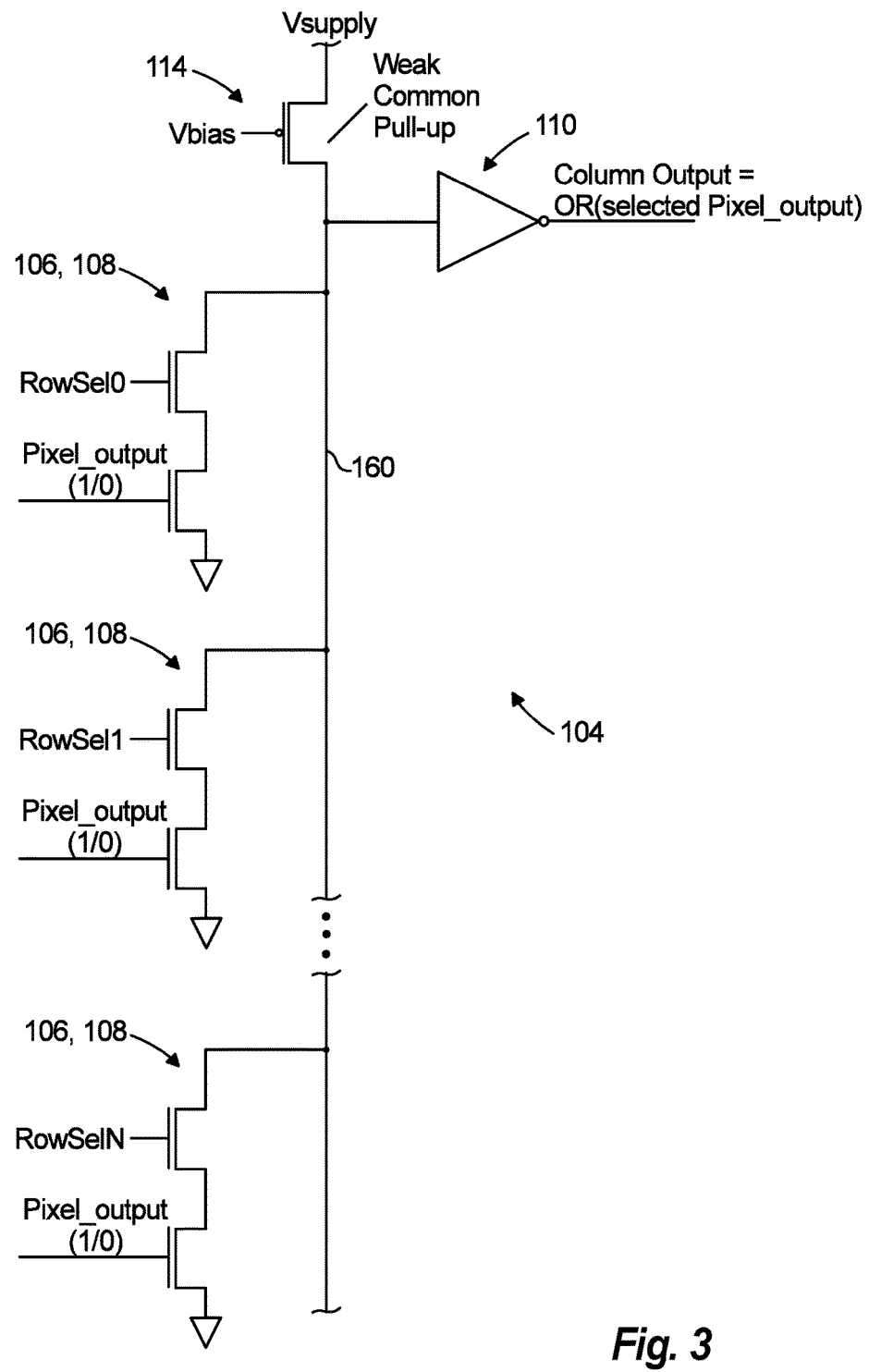
FIG. 3 is a schematic transistor level view of a portion of the ROIC of FIG. 1, showing a column of pixel readout circuits connected to the pulse output column line of FIG. 2, with OR logic for binning the column.

Referring now to FIG. 3, ROIC 104 includes an array of pixel readout circuits 106. Each pixel readout circuit 106 is operatively connected to a respective pixel of PDA 102 to receive photocurrent from a photodetector of the respective pixel. Each pixel readout circuit 106 may integrate the input photocurrent to generate image data. Each pixel readout circuit 106 may also analyze the photocurrent for high frequency events, generating a binary output data indicative of presence or lack of presence of an event detected at the PDA, e.g., wherein the event detected at the PDA 102 includes a laser pulse.

The ROIC 104 is operatively connected to the PDA 102 to receive image data, e.g., non-binary data, from the photodetectors to form an image at a first frame rate, and to record binary pulse event data from the photodetectors at a second frame rate higher than the first frame rate. For example, the first frame rate can be on the order of 30 frames per second, and the second frame rate can be on the order of 1000 frames per second. Those skilled in the art will readily appreciate that any other suitable frame rates can be used without departing from the scope of this disclosure.

Figure 4:
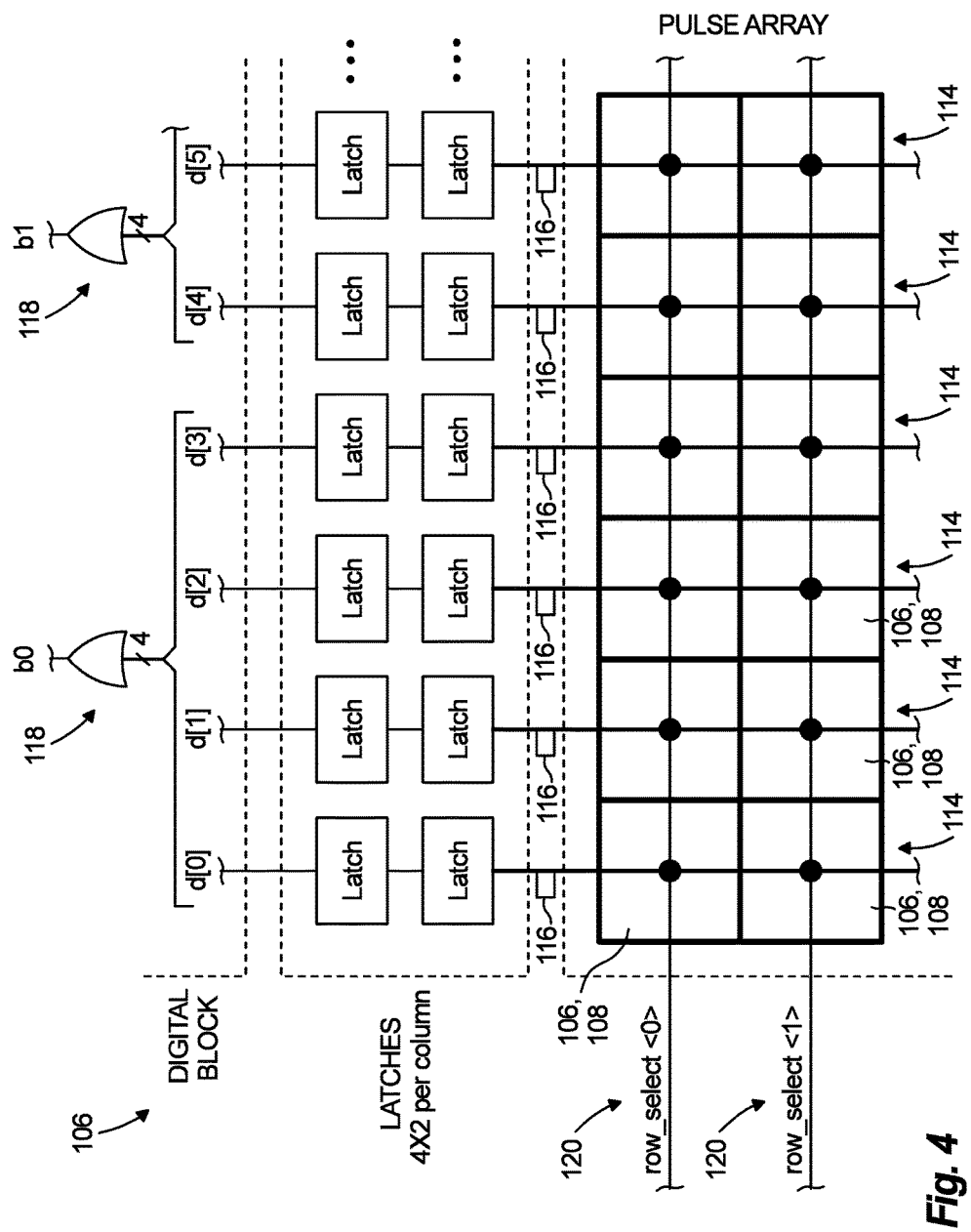
FIG. 4 is a schematic view of a portion of the ROIC of FIG. 1, showing the row selects and OR logic for output binning based on column and row.
Figure 5:
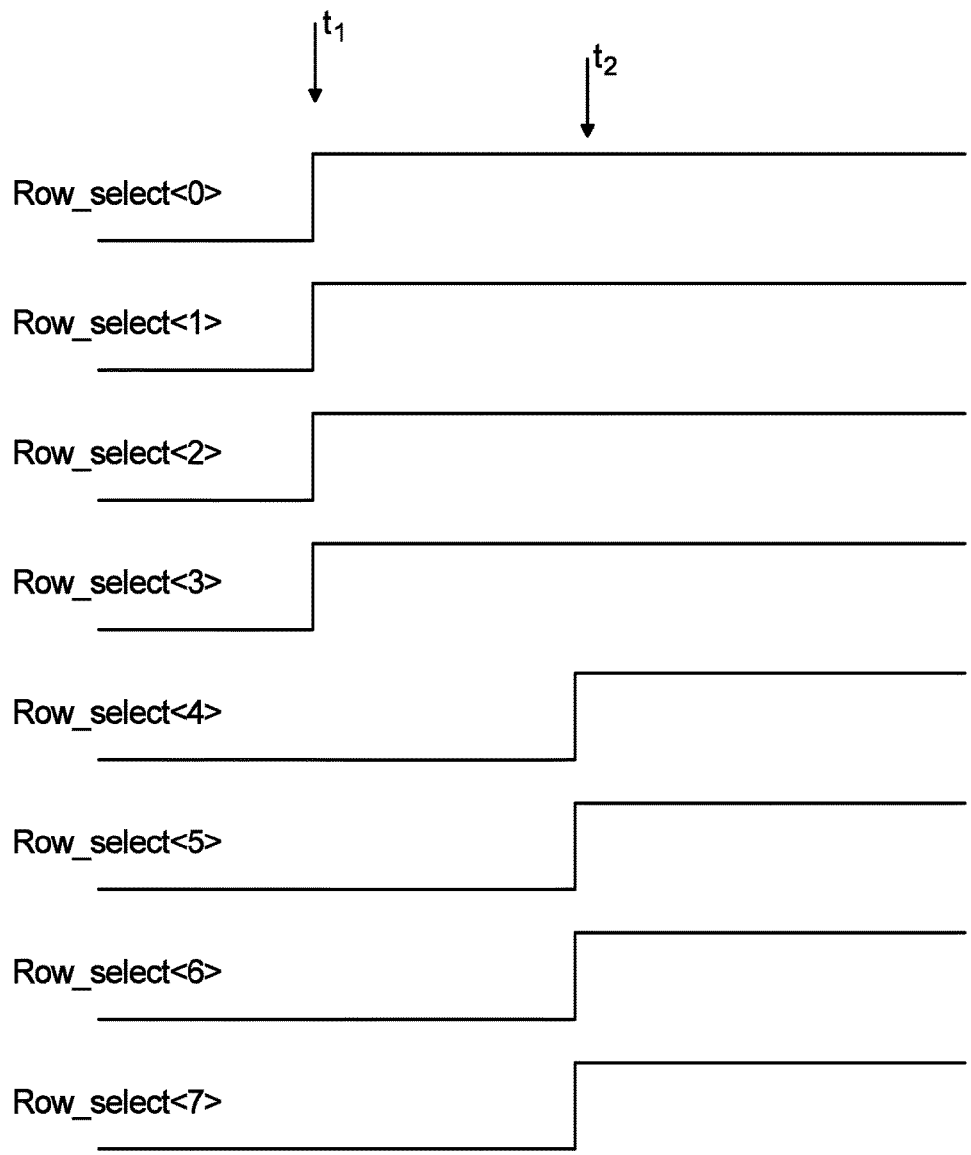
FIG. 5 is a row select timing diagram, schematically showing timing for selecting the row selects of FIG. 4.

The ROIC 104 includes logic for binning the binary data during readout, accelerating the readout time and reducing the output bandwidth requirement. The ROIC 104 includes logic, i.e., the column out output OR logic 110, for combining multiple pixels in a column 114 during readout by selecting multiple rows of pixels in the FPA 102, simultaneously connecting them to the column 114. The ellipses in FIG. 3 indicate that any suitable number of pixel readout circuits 106 can be used. The ROIC 104 can include a respective pulldown circuit 108 for each pixel, and as shown in FIG. 4, the ROIC 104 includes a respective common pull-up circuit 116 for each column 114, in a wired-OR architecture. FIG. 5 schematically shows the row select timing for binning four rows. For example, the rows labeled Row_select<0> through Row_select<4> can all be selected at a first time t1, and the next four rows labeled Row_select<4> through Row_select<7> can all be selected at a second time t2 after first time t1.

With continued reference to FIG. 4, each pixel readout circuit 106 can analyze photocurrent for high frequency events, generating binary output data, wherein pixel readout circuit 106 outputs can be binned during readout in sub-arrays of N×M pixels. Any suitable numbers can be used for N and M, however, in the example shown in FIG. 3, the binning is in 4×4 sub-arrays. So, for example four of the row selects 120 can be used together with OR logic 118 to bin a single 4×4 sub-array. The ROIC 104 includes logic, e.g., OR logic 110 and 118, to perform the logical OR function on each N×M sub-array of pixels to indicate if any pixels in the sub-array represent a logic high, e.g. a logic 1, e.g., indicating detection of a laser pulse by FPA 102. The logic of ROIC 104 generates a summary bit representing a logical high (1) for the entire sub-array if any of the pixels in the sub-array represent a logic high (1), and representing a logic low (0) for the entire sub-array if all of the pixels in the sub-array represent a logic low (0), e.g., indicating lack of a laser pulse detected by FPA 102. ROIC 104 can include logic for outputting the summary bit for each sub-array, e.g. to module 112 of FIG. 1, realizing a compression rate of N×M to 1.

A potential benefit of systems and methods as disclosed herein is that output bitmaps with lower spatial resolution but higher frame rate may be generated. In applications such as laser pulse detection, it is desirable to know the timing of a laser pulse with high temporal resolution, requiring high frame rate. Systems and methods as disclosed herein can achieve the necessary temporal resolution while still maintaining 100% field of view, with no windowing.

The ROIC 104 can be configured to accelerate binary event data readout time by a factor of N, wherein N is the number of rows in the binning sub-array, to accelerate binary event data readout time by a factor of M, wherein M is the number of columns in the binning sub-array, or to accelerate binary event data readout time by a factor of N×M, wherein N×M is the number of pixels in a binning sub-array. While described above in the exemplary context of the ROIC 104 including the Boolean OR logic function to indicate if any pixels in the sub-array represent a logic high, it is also contemplated that any other suitable Boolean logic function can be used, e.g., a logical AND, a logical NOR, or a logical NAND.

The methods and systems of the present disclosure, as described above and shown in the drawings, provide for imaging systems and methods with superior properties including high frame rate, binary output from a common FPA and ROIC from which low frame rate images are also provided. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An imaging system comprising:
   a readout integrated circuit (ROIC) operatively connected to receive photocurrent from a plurality of photodetectors; and
   an event detection circuit in each ROIC pixel readout circuit for generating binary output data, wherein the ROIC is configured to compress the binary output data with a logical summary binning of N×M pixel binary outputs into a single summary output bit, wherein the ROIC is configured to receive non-binary image data from the photodetectors to form an image at a first frame rate, and to receive the binned binary data from the photodetectors at a second frame rate higher than the first frame rate.

2. An imaging system as recited in claim 1, wherein the second frame rate is on the order of 1000 frames per second.

3. An imaging system as recited in claim 1, wherein the first frame rate is on the order of 10 frames per second.

4. An imaging system as recited in claim 1, wherein the event detected at the FPA includes a laser pulse.

5. An imaging system as recited in claim 1, wherein the ROIC includes logic to perform a logical OR function on each N×M sub-array of pixels to indicate if any pixels in the sub-array represent a logic high.

6. An imaging system as recited in claim 5, wherein the ROIC includes logic for combining multiple pixels in a column during readout by selecting multiple rows of pixels in the FPA, simultaneously connecting them to the column.

7. An imaging system as recited in claim 1, wherein the ROIC is configured to accelerate binary event data readout time by a factor of N, wherein N is the number of rows in the binning sub-array.

8. An imaging system as recited in claim 1, wherein the ROIC is configured to accelerate binary event data readout time by a factor of M, wherein M is the number of columns in the binning sub-array.

9. An imaging system as recited in claim 1, wherein the ROIC is configured to accelerate binary event data readout time by a factor of N×M, wherein N×M is the number of pixels in a binning sub-array.

10. An imaging system as recited in claim 1, wherein the ROIC includes logic to perform a Boolean logic function on each N×M sub-array to generate a single binary summary bit for each sub-array.

11. An imaging system as recited in claim 10, wherein the Boolean logic function includes a logical OR.

12. An imaging system as recited in claim 10, wherein the Boolean logic function includes at least one of a logical AND, a logical NOR, or a logical NAND.

13. An imaging system comprising:
    a readout integrated circuit (ROIC) operatively connected to receive photocurrent from a plurality of photodetectors; and
    an event detection circuit in each ROIC pixel readout circuit for generating binary output data, wherein the ROIC is configured to compress the binary output data with a logical summary binning of N×M pixel binary outputs into a single summary output bit, wherein the ROIC includes logic to perform a logical OR function on each N×M sub-array of pixels to indicate if any pixels in the sub-array represent a logic high, wherein the ROIC includes logic to generate a summary bit representing a logical high for the entire sub-array if any of the pixels in the sub-array represent a logic high, and representing a logic low for the entire sub-array if any of the pixels in the sub-array represent a logic low, and to output the summary bit for each sub-array, realizing a compression rate of N×M to 1.

14. An imaging system comprising:
    a readout integrated circuit (ROIC) operatively connected to receive photocurrent from a plurality of photodetectors; and
    an event detection circuit in each ROIC pixel readout circuit for generating binary output data, wherein the ROIC is configured to compress the binary output data with a logical summary binning of N×M pixel binary outputs into a single summary output bit, wherein the ROIC includes logic to perform a logical OR function on each N×M sub-array of pixels to indicate if any pixels in the sub-array represent a logic high, wherein the ROIC includes logic for combining multiple pixels in a column during readout by selecting multiple rows of pixels in the FPA, simultaneously connecting them to the column, wherein the ROIC includes a respective pulldown circuit for each pixel, and wherein the ROIC includes a respective common pull-up circuit for each column, in a wired-OR architecture.

* * * * *